Oct. 22, 1963 J. L. ROBINSON 3,108,227

PATTERN SUPPRESSED RING COUNTERS

Filed May 2, 1960 3 Sheets-Sheet 1

INVENTOR.
JOHN L. ROBINSON
BY
Robert D. Sanborn
ATTORNEY

INVENTOR.
JOHN L. ROBINSON
BY
Robert D. Sanborn
ATTORNEY

| | 1 | | 2 | | 3 | | 4 | | 5 | | 6 | | 7 | | 8 | |
|---|---|---|---|---|---|---|---|---|---|---|---|---|---|---|---|---|
| | A | B | A | B | A | B | A | B | A | B | A | B | A | B | A | B |
| 38 | 1 | 1 | 1 | 1 | 1 | 1 | 1 | 1 | 0 | 0 | 0 | 0 | 0 | 0 | 0 | 0 |
| 37 | 1 | 1 | 1 | 1 | 1 | 1 | 1 | 0 | 0 | 0 | 0 | 0 | 0 | 0 | 0 | 1 |
| 36 | 1 | 1 | 1 | 1 | 1 | 1 | 0 | 0 | 0 | 0 | 0 | 0 | 0 | 0 | 1 | 1 |
| 35 | 1 | 1 | 1 | 1 | 1 | 0 | 0 | 0 | 0 | 0 | 0 | 0 | 0 | 1 | 1 | 1 |
| 34 | 1 | 1 | 1 | 1 | 0 | 0 | 0 | 0 | 0 | 0 | 0 | 0 | 1 | 1 | 1 | 1 |
| 33 | 1 | 1 | 1 | 0 | 0 | 0 | 0 | 0 | 0 | 0 | 0 | 1 | 1 | 1 | 1 | 1 |
| 32 | 1 | 1 | 0 | 0 | 0 | 0 | 0 | 0 | 0 | 0 | 1 | 1 | 1 | 1 | 1 | 1 |
| 31 | 1 | 0 | 0 | 0 | 0 | 0 | 0 | 0 | 0 | 1 | 1 | 1 | 1 | 1 | 1 | 1 |

FIG. 4.

| | 1 | | 2 | | 3 | | 4 | | 5 | | 6 | | 7 | | 8 | |
|---|---|---|---|---|---|---|---|---|---|---|---|---|---|---|---|---|
| | A | B | A | B | A | B | A | B | A | B | A | B | A | B | A | B |
| 38 | 1 | 1 | 0 | 0 | 0 | 0 | 1 | 1 | 0 | 0 | 1 | 1 | 1 | 1 | 0 | 0 |
| 37 | 1 | 0 | 0 | 0 | 0 | 1 | 1 | 0 | 0 | 1 | 1 | 1 | 1 | 0 | 0 | 1 |
| 36 | 0 | 0 | 0 | 0 | 1 | 1 | 0 | 0 | 1 | 1 | 1 | 1 | 0 | 0 | 1 | 1 |
| 35 | 0 | 0 | 0 | 1 | 1 | 0 | 0 | 1 | 1 | 1 | 1 | 0 | 0 | 1 | 1 | 0 |
| 34 | 0 | 0 | 1 | 1 | 0 | 0 | 1 | 1 | 1 | 1 | 0 | 0 | 1 | 1 | 0 | 0 |
| 33 | 0 | 1 | 1 | 0 | 0 | 1 | 1 | 1 | 1 | 0 | 0 | 1 | 1 | 0 | 0 | 0 |
| 32 | 1 | 1 | 0 | 0 | 1 | 1 | 1 | 1 | 0 | 0 | 1 | 1 | 0 | 0 | 0 | 0 |
| 31 | 1 | 0 | 0 | 1 | 1 | 1 | 1 | 0 | 0 | 1 | 1 | 0 | 0 | 0 | 0 | 1 |

FIG. 5.

| | 1 | | 2 | | 3 | | 4 | | 5 | | 6 | | 7 | | 8 | |
|---|---|---|---|---|---|---|---|---|---|---|---|---|---|---|---|---|
| | A | B | A | B | A | B | A | B | A | B | A | B | A | B | A | B |
| 38 | 1 | 1 | 0 | 0 | 0 | 0 | 1 | 1 | 1 | 1 | 1 | 1 | 1 | 1 | 0 | 0 |
| 37 | 1 | 0 | 0 | 0 | 0 | 1 | 1 | 0 | 0 | 1 | 1 | 1 | 1 | 0 | 0 | 0 |
| 36 | 0 | 0 | 0 | 0 | 1 | 1 | 0 | 0 | 1 | 1 | 1 | 1 | 0 | 0 | 0 | 0 |
| 35 | 0 | 0 | 0 | 1 | 1 | 0 | 0 | 1 | 1 | 1 | 1 | 0 | 0 | 0 | 0 | 0 |
| 34 | 0 | 0 | 1 | 1 | | 0 | 1 | 1 | 1 | 1 | 0 | 0 | 0 | 0 | 0 | 0 |
| 33 | 0 | 1 | 1 | 0 | 0 | 1 | 1 | 1 | 1 | 0 | 0 | 0 | 0 | 0 | 0 | 0 |
| 32 | 1 | 1 | 0 | 0 | 1 | 1 | 1 | 1 | 0 | 0 | 0 | 0 | 0 | 0 | 0 | 0 |
| 31 | 1 | 0 | 0 | 1 | 1 | 1 | 1 | 0 | 0 | 0 | 0 | 0 | 0 | 0 | 0 | 1 |

FIG. 6.

INVENTOR.
JOHN L. ROBINSON
BY
Robert D. Sanborn
ATTORNEY

United States Patent Office 3,108,227
Patented Oct. 22, 1963

3,108,227

PATTERN SUPPRESSED RING COUNTERS

John L. Robinson, Wenonah, N.J., assignor, by mesne assignments, to Philco Corporation, Philadelphia, Pa., a corporation of Delaware Filed May 2, 1960, Ser. No. 26,129
8 Claims. (Cl. 328—43)

The present invention relates to counter circuits and more particularly to ring counters which employ multivibrators in cascade.

Computer circuits, digital communication systems and many other complex electronic equipments employ sequencing circuits which cause the system to perform prescribed operations in a preselected order. In some instances this is most easily accomplished by providing a sequencing circuit which has a plurality of output terminals or leads which are energized singly in a preselected order.

One such sequencing circuit comprises an even number of multivibrators connected in a ring by means of suitable gate circuits. All gate circuits except one in the ring are so connected that each multivibrator in the ring sets the following multivibrator to the condition of conduction of the first-mentioned multivibrator whenever the intervening gate circuit is energized. The remaining gate circuit in the ring is so connected that the multivibrator following the gate circuit is set to the condition opposite to that of the multivibrator which precedes the gate circuit. Alternate gate circuits around the ring constitute a set. The two sets of gate circuits thus formed are energized alternately from a suitable source of timing pulses. This operation of the gate circuits causes the pattern of conduction in the various multivibrators to progress around the ring in synchronism with the applied timing pulses. Coincidence circuits connect each output terminal to selected ones of the multivibrators. The points of connection of the coincidence circuits are selected so that the output connections are energized singly in a preselected sequence.

Sequencing circuits of this type operate satisfactorily if only four multivibrators are included in the chain. However if more than four multivibrators are included in the chain the operation tends to become erratic. That is, at times the output terminals will be energized in the proper sequence and at other times the output terminals may be energized in other than their proper sequence.

I have discovered that the cause of the erratic operation in multivibrator counter circuits of the type described is due to spurious patterns of conduction in the multivibrator chain which activate the coincidence circuits out of their proper sequence.

Therefore it is an object of the present invention to provide an improved multivibrator counter chain which is free from the effects of spurious conduction patterns.

A further object is to provide a multivibrator chain which if upset by noise or external disturbance will revert back to the particular pattern for which the circuit was designed.

It is also an object of the present invention to provide this freedom from spurious patterns without sacrificing any of the speed of which the counter is otherwise capable and without stopping the counter.

Another object of the present invention is to provide a relatively long multivibrator counter chain which provides unambiguous output signals.

These and other objects of the present invention are achieved by providing a multivibrator chain in which the state of conduction of at least one multivibrator in the chain is controlled jointly by the timing signals supplied to the circuit, the state of conduction of the preceding multivibrator in the chain, and the state of conduction of a third multivibrator elsewhere in the chain.

For a better understanding of the present invention together with other and further objects thereof, reference should now be made to the following detailed description which is to be read in conjunction with the accompanying drawings in which:

FIGS. 1 and 2 together form a block diagram of one embodiment of the present invention;

FIG. 1*a* is a series of waveforms illustrating the timing signals supplied to the circuit of FIG. 1;

FIGS. 4, 5 and 6 are tables illustrative of the operation of the circuits of FIGS. 1 and 2.

Figure 2:
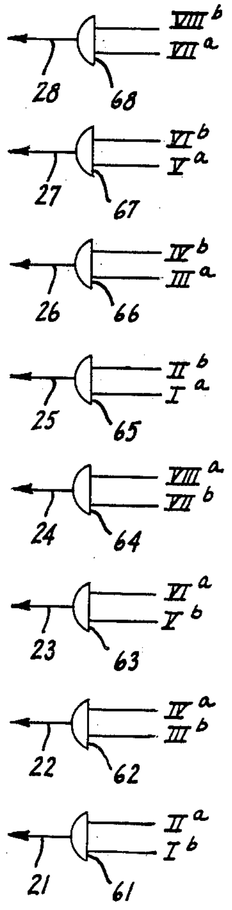
Figure 1:
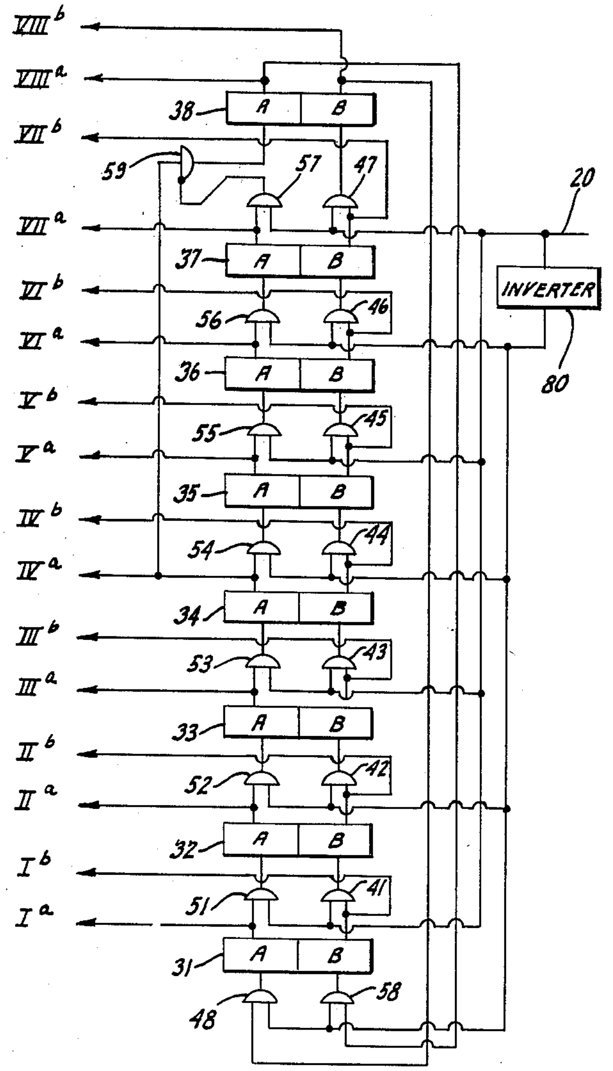

The timing chain shown in FIGS. 1 and 2 is a "scale of eight" counter, that is, eight output terminals 21–28 are energized in sequence in response to eight successive timing signals supplied at input 20 of FIG. 1. The double rectangles 31–38 in FIG. 1 represent the eight multivibrators of the chain. Multivibrators 31 through 38 are preferably symmetrical multivibrator circuits. In the description which follows one half of each multivibrator will be designated the "A" side and the other half as the "B" side. Each multivibrator has two stable states. Therefore it is convenient to use the binary notation and refer to one stable state as the "zero" state of the multivibrator and the other stable state as the "one" state of the multivibrator. This terminology will be employed throughout the specification. Since the circuits are symmetrical, it is immaterial which state is designated the "zero" state and which is designated the "one" state. However in order to facilitate the description, it will be assumed that when the output of the "A" side of the multivibrator is at a relatively negative potential, the multivibrator is in the "zero" state and when the output of the "A" side is near ground potential, the multivibrator is in the "one" state. Of course, when the output of the "A" side is near ground the output of the "B" side is at a negative potential and vice versa.

Gate circuits 41 through 47 couple the "B" side of each of the multivibrators 31 through 37 to the "B" side of the following multivibrator in the chain. A similar gate circuit 48 couples the "B" side of multivibrator 38 to the "A" side of multivibrator 31. A second series of gates 51 through 57 couple the "A" side of multivibrators 31 through 37 to the "A" side of the following multivibrator. The eighth gate circuit 58 of this series couples the "A" side of multivibrator 38 to the "B" side of multivibrator 31. The connection from gate 57 to the "A" side of multivibrator 38 is made by way of an additional gate circuit 59. As will be explained in more detail later, gate circuit 59 is the pattern suppression gate in the circuit of FIG. 1.

The output connections from the "B" side of multivibrators 31 through 38 have been designated as $I^b$–$VIII^b$ in FIG. 1. Similarly the output of the "A" side of multivibrators 31 through 38 have been identified as $I^a$–$VIII^a$. The 16 output leads $I^a$–$VIII^a$ and $I^b$–$VIII^b$ are connected to the output terminals 21–28 by way of the eight two-input coincidence circuits 61–68 of FIG. 2. As indicated by the $I^b$ and $II^a$ on the inputs to coincidence circuit 61, the two inputs of this coincidence circuit are connected to the "B" side of multivibrator 31 and the "A" side of multivibrator 32, respectively, of FIG. 1. The reference numerals $II^b$ through $VIII^b$, $I^a$ and $III^a$ through $VIII^a$ in FIG. 2 similarly identify the connections between the coincidence circuits 62–68 of FIG. 2 and the outputs of multivibrators 31 through 38 of FIG. 1. In the following description it will be assumed that coincidence circuit 61, for example, is of the type which will cause the output lead 21 to be at one potential if either one or both of the input connections $I^b$ and $II^a$ are energized and at a different potential if neither of the two inputs is energized. Coincidence circuits 62 to 68 are assumed to be identical to coincidence circuit 61. However it lies within the scope of the invention to provide coincidence circuits which cause the output connection to be at one potential if both input leads are energized and at a different potential if less than both input leads are energized. It is possible to design coincidence circuits to provide an output of any polarity for any combination of states of the counter. This also lies within the scope of the invention. One preferred form of coincidence circuit is shown in detail in FIG. 3.

Gates 41–48, 51–58 and 59 of FIG. 1 are again a form of two input coincidence circuits. These circuits are such that both inputs must be energized before the gate is operative. As shown in FIG. 1, one input of gates 41–48 is energized by the "B" side of the respective multivibrator 31–38 associated therewith. The second inputs of gates 41, 43, 45 and 47 are energized directly from the stepping or timing pulse input connection 20. The second inputs of gates 42, 44, 46 and 48 are energized by the output of inverter 80 which has its input connected to the timing pulse input connection 20. Similarly one input of each of the gates 51 through 57 is energized by the output of the "A" side of multivibrators 31 through 38, respectively. The second input of each of the gate circuits 51, 53, 55 and 57 is energized directly from input connection 20. The second input of each of the gates 52, 54, 56 and 58 is energized by the output of inverter 80. One input of gate 59 is energized by the output of gate 57 and the second input of gate 59 is energized by the output connection IV$^a$ of the "A" side of multivibrator 34.

Gate circuits 41 and 51 have been shown in separate circuits even though both have one side energized directly from the input lead 20. As will be seen in FIG. 3, certain economy of parts can be achieved by combining portions of gates 41 and 51 and by combining like portions of the other gate pairs which separate multivibrators 32—37. The pairs 41—51, 42—52, etc. form double path, signal actuated gate circuits which permit jam transfer of data from one multivibrator to the next. Portions of gates 47, 57 and 59 may be combined as shown in FIG. 3.

Figure 3:
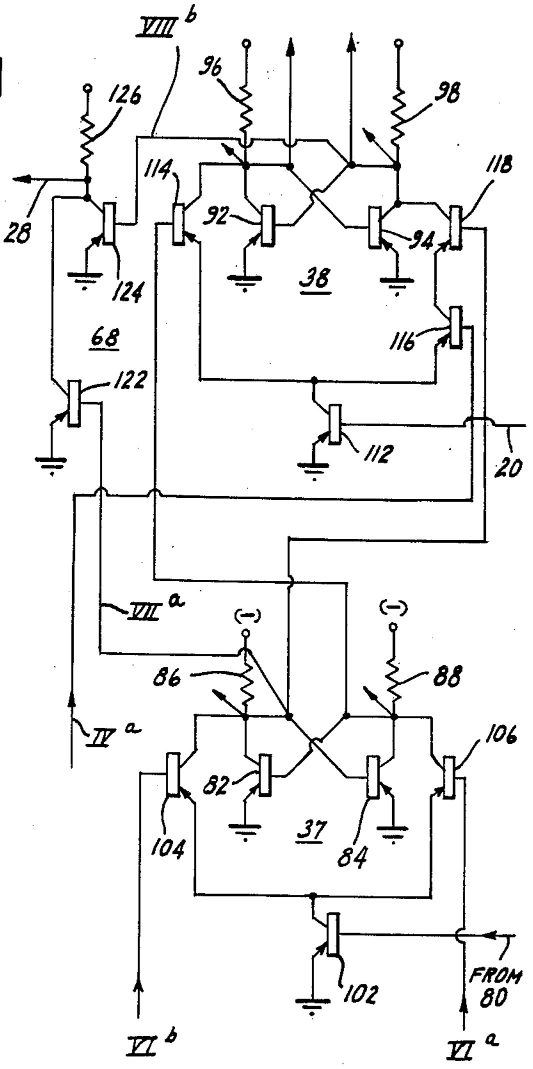
FIG. 3 is a schematic diagram of a representative portion of the block diagram of FIGS. 1 and 2.

FIG. 3 illustrates one preferred form which multivibrators 37 and 38 and the gate circuits associated therewith may take. FIG. 3 may be taken as representative of any other pair of multivibrators in the circuit provided it is understood that gate 59 is included only between multivibrators 37 and 38 and that the connections from the "A" and "B" sides of multivibrator 38 are to the "B" and "A" sides, respectively, of multivibrator 31. The circuit of FIG. 3 employs PNP type transistors and direct coupled transistor logic which is now well known in the computer art. Of course, any other type of coupling could be used. Also NPN transistors could be used. Multivibrator 37 in FIG. 3 comprises two transistors 82 and 84 and associated collector resistors 86 and 88. The collector electrode of transistor 82 is connected directly to the base electrode of transistor 84. Similarly the collector of transistor 84 is connected to the base of transistor 82. The multivibrator circuit thus formed has two electrically stable states. That is, if by any convenient means the collector potential of transistor 82 is brought near ground potential this will turn transistor 84 off and cause the collector of this transistor 84 to be at or near the negative source potential. The bias source is represented by the minus (—) sign in FIG. 3. Since the collector of transistor 84 is at a relatively negative potential, it will maintain transistor 82 in the conducting condition and maintain the collector potential of this transistor 82 near ground potential. Conversely, if the collector potential of transistor 84 is brought near ground potential, transistor 82 will be cut off and the collector of this transistor will assume a negative potential. This negative potential will render transistor 84 conductive and maintain the collector of transistor 84 near ground potential. Multivibrator 38 is similarly composed of two transistors 92 and 94 with the associated collector resistors 96 and 98. All of the multivibrators 31 through 38 may be identical. Therefore the showing of FIG. 3 is representative of all of the multivibrators in the chain.

The functions of the two gate circuits 46 and 56 of FIG. 1 are performed by the three transistors 102, 104 and 106. Transistors 102 and 104 form a two input "and" gate which corresponds in function to gate 46 of FIG. 1. Similarly transistors 102 and 106 perform the functions of "and" gate 56 in FIG. 1. The function of "and" gate 47 of FIG. 1 is performed by transistors 112 and 114. It can be seen from FIG. 3 that if transistor 84 is not conducting and the collector of this transistor is at a negative potential, the collector of transistor 92 will be placed at ground potential by completing a conductive path through transistors 112 and 114. Placing the collector of transistor 92 at ground potential will place the collector of transistor 94 at a negative potential which corresponds to the negative potential of the collector of transistor 84 in multivibrator 37.

The functions of gates 57 and 59 are performed in FIG. 3 by transistors 112, 116 and 118. Lead IV$^a$ in FIG. 3 corresponds to the similarly numbered lead in FIG. 1. The transistors 112, 116 and 118 of FIG. 3 form what is known as a "three-high and gate." The bases of all three transistors must be energized before a circuit is completed from the collector electrode of transistor 94 to ground.

The coincidence circuit 68 in FIG. 3 comprises two transistors 122 and 124 which share a common collector impedance 126. It will be seen that if either transistor 122 or 124 or both of these transistors is conductive, the common collector terminal will be at ground potential. If both of these transistors are non-conducting, then the common collector potential, which corresponds to output lead 28, will be at a relatively negative potential.

The operation of the circuit of FIGS. 1 and 2 will now be explained. The signal supplied at input 20 is shown at A in FIG. 1*a*. It will be seen that this signal is a symmetrical, square wave. This is illustrative only of one preferred embodiment of the invention. The condition of conduction of the multivibrators will change on each alternation of the timing signals. The two "half cycles" may be equal or unequal and the "period" may be regular or irregular. Gate circuits 51, 53, 55 and 57 and 41, 43, 45 and 47 are conditioned for conduction by the negative half-cycles 130 and 132. The output of inverter 80 is shown at B in FIG. 1*a*. The gates coupled to the output of inverter 80 are conditioned for conduction by the negative half-cycles 134 and 136.

Column 1A of FIG. 4 corresponds to the condition of conduction of the multivibrators 31 through 38 on the first half cycle 130 of the timing or stepping signal at input 20. Column 1B corresponds to the condition of these multivibrators on the second half cycle of the first timing pulse, i.e. the first half cycle 134 from inverter 80. The eight numbered columns represent eight successive timing pulses. As will be explained later, the pattern shown for the first eight timing pulses repeats cyclically every eight timing pulses.

It will be assumed that each of the multivibrators 31 through 38 is initially in the "one" state. The manner in which the multivibrators arrived at this state is immaterial since, as will be pointed out later, the circuit will achieve this assumed state after a relatively few timing pulses from any random state of conduction of the multivibrators 31–38. The terms "compatible state," "incompatible state" and "incompatibility" as used in the following description are used as follows: If two adjacent multivibrators are in such a state that energizing either one of the two gates connecting these two multivibrators will cause the multivibrator following the gate to be reset, the multivibrators are said to be in incompatible states. It will be assumed that the "incompatibility" exists between the multivibrators which are in incompatible states rather than in either multivibrator per se. If energizing the gate circuits between two multivibrators produces no change in state in the multivibrator following the gate, the multivibrators are said to be in a "compatible state." It is conventient also to keep in mind that, by definition, an incompatibility exists between each of the multivibrators 31 through 37 and the next following multivibrator (e.g. between multivibrators 31 and 32, 32 and 33, etc.) if the preceding multivibrator is set either to the "zero" or "one" state and the following multivibrator is set to the opposite state. An incompatibility exists between multivibrators 38 and 31 if the two multivibrators are in the same state. This difference between multivibrators 38 and 31 and the other multivibrators is due to the cross-connection from the "A" and "B" sides of multivibrator 38 to the "B" and "A" sides, respectively, of multivibrator 31. The locations of the incompatibility are represented in FIG. 4 by the horizontal dashes. It will be noted that if the multivibrators are in the condition shown in column 1A of FIG. 4 and all of the gates 41 through 47 and 51–57 were energized at one time, no change in the pattern of conduction of the multivibrators would take place. That is, each multivibrator 31 through 37 is in a compatible state with the one which follows. However, gate 48 connects the "B" side of multivibrator 38 which is in the "one" state to the "A" side of multivibrator 31 which is in the "one" state. Thus an incompatibility exists between multivibrator 38 and multivibrator 31. If gate 48 is energized alone, multivibrator 31 will be set to the "zero" state. This removes the incompatibility from between multivibrator 38 and multivibrator 31. However an incompatibility now exists between multivibrators 31 and 32. It is convenient to assume that the action of gate 48 is to transfer the incompatibility which existed between multivibrators 38 and 31 to the position between multivibrators 31 and 32.

Figure 1A:
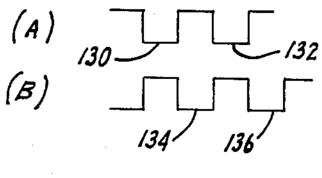

Returning now to the condition assumed for the first half cycle of the timing signal which is represented in column 1A of FIG. 4, it will be seen that one input of each of the gate circuits 41, 43, 45, 47 and 51, 53, 55 and 57 is activated by the signal on lead 29 during the negative half cycle 130 of FIG. 1*a*. A direct connection will be established between multivibrators 31 and 32, 33 and 34, 35 and 36, 37 and 38 through gates 41, 43, 45 and 47, respectively. Since no incompatibility exists between these various pair of multivibrators, no change in the conduction pattern of the circuit will result.

On the next half cycle the output of inverter 80 energizes the eight gates associated therewith. Gates 51 through 58 are inactive since there is no multivibrator set at "zero." Gates 42, 44, 46 and 48 are active. As noted above, gate 48 will change multivibrator 31 to the "zero" state. Gates 42, 44 and 46 will have no effect on the conduction pattern of the multivibrators since no incompatibility exists between the pairs of multivibrators connected by these three gates. The condition of the multivibrators is now shown by column 1B of FIG. 4.

On the next succeeding half cycle of the timing signal, gates 51, 43, 45 and 47 are activated. This sets multivibrator 32 to the "zero" state but makes no change in the conducting pattern of the other multivibrators. See column 2A of FIG. 4. The operation of the circut on successive timing pulses can be readily determined by reference to FIG. 4. The numbered columns identify the cycle of the timing pulse. The subheadings A and B identify the first and second halves of each cycle.

It will be seen from FIGS. 2 and 3 that output lead 28 of FIG. 2 will be at a high potential only when input leads $VII^a$ and $VIII^b$ are near ground potential. This occurs only when multivibrator 37 is set to the "one" state and multivibrator 38 is set to the "zero" state. An inspection of FIG. 4 will show that this condition occurs only during half cycle 8B and at no other time throughout the operation. Similarly it can be shown that output lead 27 is energized only during half cycle 7B and at no other time. It should be noted that it is only necessary to sense two of the eight multivibrators in order to obtain the energization of the proper output connection. In certain forms of prior art ring counters a matrix circuit sensing all elements of the ring is necessary in order to energize the proper output.

It will be seen from an inspection of FIG. 4 that the gate 59 is always operative to pass a signal whenever gate 57 is energized to transfer a "zero" from multivibrator 37 to multivibrator 38 when this latter multivibrator is in the "one" state. It will be remembered that it is immaterial whether gate 59 is energized at the same time as gate 57 if both multivibrators 37 and 38 are both in the "zero" state since no change in the state of conduction of multivibrator 38 is to be made under these conditions.

If there are six or more multivibrators in the chain, it is possible for these multivibrators to assume conduction patterns other than the ones shown in the various columns of FIG. 4. If it is assumed that the multivibrators when initially energized may assume at random either the "one" or "zero" state, the various multivibrators of the circuit of FIG. 1 may assume the conduction state shown in column 1A of FIG. 5, for example. Here it is assumed that multivibrators 31, 32, 37 and 38 are initially in the "one" state and that multivibrators 33 through 36 are initially in the "zero" state. It can be shown that the number of incompatibilities around a loop of the type shown in FIG. 1 must be odd and that adjacent incompatibilities must be spaced by an even number of multivibrators. If they are not, they will become spaced by two multivibrators after the first timing pulse. As shown by column 1A of FIG. 5, the incompatibilities in the conduction pattern now under consideration are between multivibrators 32 and 33, between multivibrators 36 and 37 and between multivibrators 38 and 31. In the absence of any pattern suppression means these incompatibilities will be propagated around the circuit on successive half cycles of the timing signal as illustrated by the successive columns of FIG. 5.

It can be seen from FIG. 5 that output lead 28 will be energized at the times corresponding to columns 3B, 5B and 8B of FIG. 5. That is, this output lead will be energized three times for every eight input timing pulses rather than the desired once per eight timing pulses. Furthermore, it can be shown that three output leads may at times be energized at once rather than only one output lead.

The function of gate circuit 59 of FIG. 1 is to suppress the two extraneous incompatibilities present in the pattern of FIG. 5 and thus convert one of the conduction configurations of FIG. 5 to one of the configurations of FIG. 4. Once this is accomplished the circuit will continue to propagate the patterns shown in FIG. 4 unless disturbed by noise impulses or the like. The extraneous incompatibilities of the patterns of FIG. 5 are suppressed by preventing the transfer of a "zero" from multivibrator 37 to multivibrator 38. It can be shown that this has the effect of merging two of the incompatibilities of the pattern of FIG. 5 so that they cancel one another. It will be seen that, in the desired patterns of FIG. 4, when multivibrator 38 is to be reset from a "one" to a "zero" by a signal transferred from the "A" side of multivibrator 37, multivibrator 34 is in a "zero" state in the half cycle preceding the transfer and in the half cycle in which the transfer occurs. It can be seen also that in the patterns shown in FIG. 5 and more particularly FIG. 5, column 5A, a "zero" is transferred from multivibrator 37 to multivibrator 38 when multivibrator 34 is in the "one" state. Since the "A" side of multivibrator 34 is not negative, the transfer of the "zero" from multivibrator 37 to multivibrator 38 is blocked by gate circuit 59 and multivibrator 38 will remain in the "one" state.

The operation of the circuit of FIG. 1 with gate circuit 59 in place is illustrated by the table of FIG. 6. It will be noted that a "zero" is transferred from multivibrator 37 to multivibrator 38 in column 2A. However the output of multivibrator 34 is "zero" in the cycle preceding the transfer and in practice remains "zero" for a portion of the half cycle at which the transfer takes place. Therefore no pattern suppression occurs during this half cycle. No other time occurs at which multivibrator 38 is in the "one" state and is changed to a "zero" state by a signal from multivibrator 37 until the fifth clock pulse (column 5A). As shown in FIG. 6, at the time this transfer is to take place multivibrator 34 is in the "one" state. During the time interval represented by column 5B no transfer is to be made from multivibrator 37 to multivibrator 38 so that gates 47 and 57 are inactive. However during this interval multivibrator 37 is reset to the "one" state by the output of multivibrator 36. It will be seen from FIG. 6 that this has the effect of merging the two incompatibilities which existed on either side of multivibrator 37 so that the pattern shown in column 5B of FIG. 6 corresponds to the pattern shown in column 2B of FIG. 4. It will be seen that the circuit of FIG. 1 will now continue to propagate the patterns shown in FIG. 4. If the conduction patterns of the multivibrators are upset for any reason, such as temporary malfunction of one of these circuits, the patterns will be automatically corrected by gate 59 in the manner just described.

Figure 7:
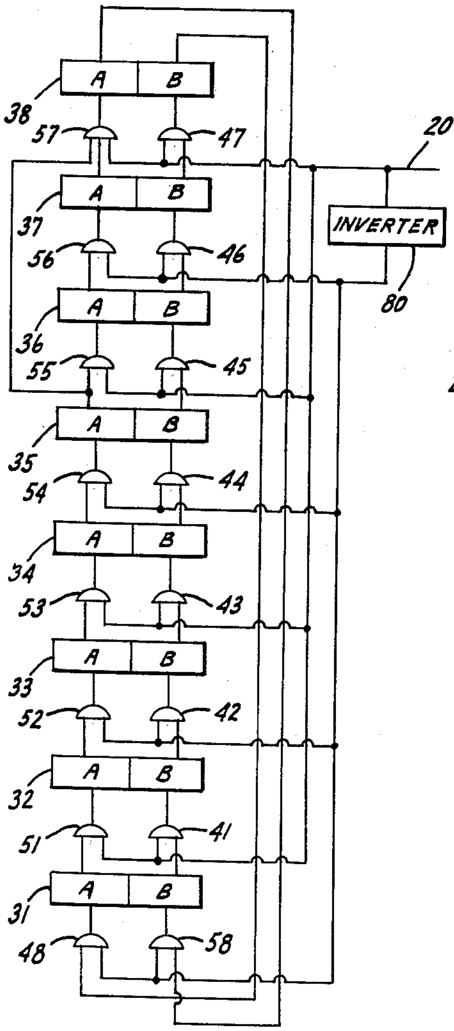
FIG. 7 is a partial diagram of still another counter chain embodying the principles of this invention.

It will be seen from FIG. 6 that multivibrator 38 is reset from a "one" to a "zero" in column 2A. However it should be noted that multivibrator 34 is a "zero" in the half cycle prior to the time this transfer is to take place but is changed to a "one" during the same half cycle in which multivibrator 38 is reset. This places the limitation on the multivibrator circuits that a signal sufficient to reset multivibrator 38 must be propagated through gates 57 and 59 before multivibrator 34 resets to the "one" condition. This condition is generally met in practice if multivibrators 34 and 38 have the same resetting time. Furthermore the resetting of multivibrator 34 will be delayed slightly in the circuit of FIG. 1 by the added capacitance of the gate circuit 59. This restriction on the operation of the circuit can be removed by obtaining the actuating signal for gate 59 from the output of multivibrator 35 as shown in FIG. 7 rather than from the output of multivibrator 34 as shown in FIG. 1. Parts in FIG. 7 corresponding to like parts in FIG. 1 have been identified by the same reference numeral. The output connections from the circuit of FIG. 7 have not been shown in order to simplify the drawing. However in practice they would be the same connections as shown in FIG. 1. Since multivibrator 35 is not reset during the half cycle in which multivibrator 38 is reset, the timing restriction mentioned above is completely eliminated. Again it can be shown that, for the desired pattern, multivibrator 38 is reset from a "one" to a "zero" only at those times at which multivibrator 35 is in the "zero" state. Timing chains having more than eight multivibrators in the series may require more than one pattern suppression gate.

While the invention has been described with reference to a certain preferred embodiment thereof, it will be apparent that various modifications and other embodiments thereof will occur to those skilled in the art within the scope of the invention. Accordingly I desire the scope of my invention to be limited only by the appended claims.

I claim:

1. A counter circuit comprising a plurality of bi-stable multivibrators, a like plurality of signal actuated gate circuits interposed between said multivibrators to form a closed chain, each gate circuit coupling a respective one of said multivibrators to the following multivibrator in said chain, alternate gate circuits in said chain forming a first set, the remaining gate circuits in said chain forming a second set, a source of timing signals, first means coupling said source of timing signals to said first set of gate circuits, second means coupling said source of timing signals to said second set of gate circuits, said first set of gate circuits being conditioned for conduction on selected half cycles of said timing signals, said second set of gate circuits being conditioned for conduction on the alternate half cycles of said timing signals, each of said gate circuits being jointly responsive to the timing signals supplied thereto and the output of the preceding multivibrator in said chain, one of said gate circuits being additionally jointly responsive to the output of a second multivibrator elsewhere in said chain, said second multivibrator being one which, for state patterns having one incompatibility, is in the same state each time a signal is to be transferred by way of said one gate circuit.

2. A counter circuit comprising a plurality of bi-stable multivibrators, a like plurality of normally-blocked, double-path, signal-actuated gate circuits interposed between said multivibrators to form a closed chain, said gate circuits being connected to provide jam transfer of data, each gate circuit coupling a respective one of said multivibrators to the following multivibrator in said chain, each path of each gate circuit except for one gate circuit coupling one side of one multivibrator to the corresponding side of the following multivibrator, each path of said last mentioned one gate circuit coupling one side of one of said multivibrators to the opposite side of the following multivibrator in said chain, alternate gate circuits in said chain forming a first set, the remaining gate circuits in said chain forming a second set, a source of timing signals, first means coupling said source of said timing signals to said first set of gate circuits, second means coupling said source of said timing signals to said second set of gate circuits, said first set of gate circuits being conditioned for conduction on selected half cycles of said timing signals, said second set of gate circuits being conditioned for conduction on the alternate half cycles of said timing signals, each of said gate circuits being jointly responsive to the timing signals supplied thereto and the output of the preceding multivibrator in said chain, one path of one of said gate circuits being additionally jointly responsive to the output of a second multivibrator elsewhere in said chain, said second multivibrator being one which, for state patterns having one incompatibility, is in the same state each time a signal is to be transferred by way of said one path of said one gate circuit.

3. A counter circuit comprising eight bi-stable multivibrators, eight signal actuated gate circuits, one of said gate circuits being interposed between each pair of multivibrators thereby to form a closed chain, said gate circuits being connected to provide jam transfer of data from one multivibrator to the following multivibrator in the chain, alternate gate circuits in said chain forming a first set, the remaining gate circuits in said chain forming a second set, a source of timing signals, first means coupling said source of timing signals to said first set of gate circuits, second means coupling said source of timing signals to said second set of gate circuits, said first set of gate circuits being conditioned for conduction on selected half cycles of said timing signals, said second set of gate circuits being conditioned for conduction on the alternate half cycles of said timing signals, each of said gate circuits being jointly responsive to the timing signals supplied thereto and the output of the preceding multivibrator in said chain, one of said gate circuits being additionally jointly responsive to the output of the fourth preceding multivibrator in said chain.

4. A counter-circuit comprising $n$ bi-stable elements each having first and second inputs and at least one output, where $n$ is a whole integer greater than four, each of said bi-stable elements being responsive to the application of a first selected signal to said first input and a second selected signal to said second input to assume a first of two stable states and responsive to the application of said first selected signal to said second input and said second selected signal to said first input to assume the other of two stable states, $n$ signal actuated coupling means coupling said bi-stable elements to form a closed chain, means coupling an input of a selected one of said coupling means to the output of a second bi-stable element in said closed chain, each of said coupling means causing first and second signals to be separately supplied to said first and second inputs, respectively, of the following bi-stable elements in said closed chain in response to a selected signal at the output of the preceding bi-stable element in said chain and the application of actuating signals to said coupling means, means for supplying stepping signals to said coupling means, said signal actuated coupling means except said selected coupling means being responsive to the application thereto of said stepping signals to pass the output signal of the preceding bi-stable element in said closed chain to the inputs of the following bi-stable element in said chain, said selected coupling means being jointly responsive to said stepping signals and the output of said second bi-stable element for passing a signal from the bi-stable element preceding it in said closed chain to the bi-stable element following it in said closed chain, said second bi-stable element being one which, for state patterns within said closed chain having only one incompatibility, has the same output signal each time a signal is to be transferred by way of said selected coupling means.

5. A counter-circuit comprising $n$ bi-stable elements each having first and second inputs and an output, where $n$ is a whole integer greater than four, each of said bi-stable elements being responsive to the application of a first selected signal to said first input and a second selected signal to said second input to assume a first of two stable states and responsive to the application of said first selected signal to said second input and said second selected signal to said first input to assume the other of two stable states, $n$ signal actuated coupling means coupling said bi-stable elements to form a closed chain, each of said coupling means being coupled to the output of the bi-stable element preceding it in said closed chain, means coupling an input of a selected one of said coupling means to the output of a second bi-stable element in said closed chain, each of said coupling means causing first and second signals to be separately supplied to said first and second inputs, respectively, of the bi-stable element following it in said closed chain in response to actuating signals applied to said coupling means, said coupling means interconnecting said bi-stable elements in a manner such that a state pattern having one incompatibility may be continuously recirculated in said chain, alternate signal coupling means in said chain forming a first set, the remaining signal actuated coupling means in said chain forming a second set, a source of stepping signals, means coupled to said source for simultaneously supplying stepping signals to each of said signal actuated coupling means of said first set at spaced time intervals, means coupled to said source for supplying stepping signals to said signal coupling means of said second set at intervening time intervals, each of said signal actuated coupling means being jointly responsive to said stepping signals and the output signal of the preceding bi-stable element in said closed chain, said selected coupling means being jointly responsive to said stepping signals, the output of a said preceding bi-stable element in said closed chain and the output of said second bi-stable element, said second bi-stable element being one which, for the state pattern having one incompatibility, has the same output signal each time a signal is to be transferred by way of said selected coupling means.

6. A counter-circuit comprising $n$ bi-stable elements each having first and second inputs and first and second outputs, where $n$ is a whole integer greater than four, each of said bi-stable elements being responsive to the application of a first selected signal to said first input and a second selected signal to said second input to assume a first of two stable states and responsive to the application of said first selected signal to said second input and said second selected signal to said first input to assume the other of two stable states, said first and second selected signals being binary complements, said bi-stable elements presenting complementary signals at said first and second outputs, $n$ signal actuated coupling means coupling said bistable elements to form a closed chain, each of said signal actuated coupling means providing in response to actuating signals supplied thereto a first signal path between one of said outputs of the bi-stable element preceding it in said closed chain and one of said inputs of the bi-stable element following it in said closed chain and a second path between the other of said outputs of said preceding bi-stable element and the other of said inputs of the said following bi-stable element, said connections being selected so that a pattern having one incompatibility may be continuously recirculated in said chain in response to applied stepping signals, means for supplying stepping signals to said signal actuated coupling means, means coupling one of said coupling means to the output of a bi-stable element other than the one preceding it in said closed chain, said one coupling means being jointly responsive to said stepping signals and the output of said other bi-stable element, said other bi-stable element being one which for state patterns having only one incompatibility has the same output signal each time a signal is to be transferred by way of said one coupling means.

7. A counter-circuit comprising $n$ substantially identical bi-stable multivibrators, $n-1$ substantially identical signal actuated gate circuits, an additional signal actuated gate circuit, said signal actuated gate circuits being interposed between said multivibrators to form a closed chain, each gate circuit coupling a respective one of said multivibrators to the following multivibrator in said chain, alternate gate circuits in said chain forming a first set, the remaining gate circuits in said chain forming a second set, a source of timing signals, first means coupling said source of timing signals to said first set of gate circuits, second means coupling said source of timing signals to said second set of gate circuits, said first set of gate circuits being conditioned for conduction on selected half cycles of said timing intervals, said second set of gate circuits being conditioned for conduction on alternate half cycles of said timing signals, each of said $n-1$ gate circuits being jointly responsive to the timing signals supplied thereto and the output of the preceding multivibrator in said chain, said additional gate circuit being additionally jointly responsive to the output of a second multivibrator elsewhere in said chain, said second multivibrator being one which, for state patterns having one incompatibility, is in the same state each time a signal is to be transferred by way of said additional gate circuit.

8. A counter-circuit comprising $n$ substantially identical bi-stable multivibrators, $n-1$ substantially identical normally blocked, double path, signal actuated gate circuits, an additional normally blocked, double path, signal actuated gate circuit, said signal actuated gate circuits being interposed between said multivibrators to form a closed chain, said gate circuits being connected to provide jam transfer of data, each gate circuit coupling a respective one of said multivibrators to the following multivibrator in said chain, each path of each gate circuit except for one gate circuit coupling one side of one multivibrator to the corresponding side of the following multivibrator, each path of said last-mentioned one gate circuit coupling one side of one of said multivibrators to the opposite side of the following multivibrator in said chain, alternate gate circuits in said chain forming a first set, the remaining gate circuits in said chain forming a second set, a source of timing signals, first means coupling said source of timing signals to said first set of gate ecircuits, second means coupling said source of timing signals to said second set of gate circuits, said first set of gate circuits being conditioned for conduction on selected half cycles of said timing signals, said second set of gate circuits being conditioned for conduction on the alternate half cycles of said timing signals, each of said gate circuits being jointly responsive to the timing signals supplied thereto and the output of the preceding multivibrator in said chain, one path of said additional gate circuit being additionally jointly responsive to the output of the second multivibrator elsewhere in said chain, said second multivibrator being one which, for state patterns having one incompatibility, is in the same state each time a signal is to be transferred by way of said one path of said additional gate circuit.

References Cited in the file of this patent

UNITED STATES PATENTS

| | | |
|---|---|---|
| 2,806,947 | MacKnight | Sept. 17, 1957 |
| 2,816,223 | Nelson | Dec. 10, 1957 |
| 2,880,934 | Bensky et al. | Apr. 7, 1959 |